March 13, 1956   R. A. McNAUGHTON   2,738,459
SHOCK TESTER FOR ELECTRON DISCHARGE DEVICES
Filed July 25, 1952
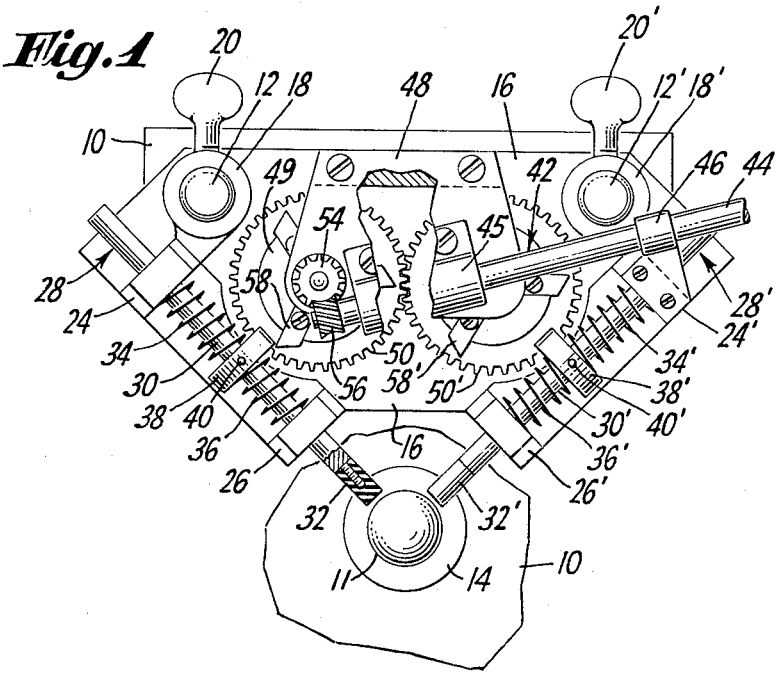
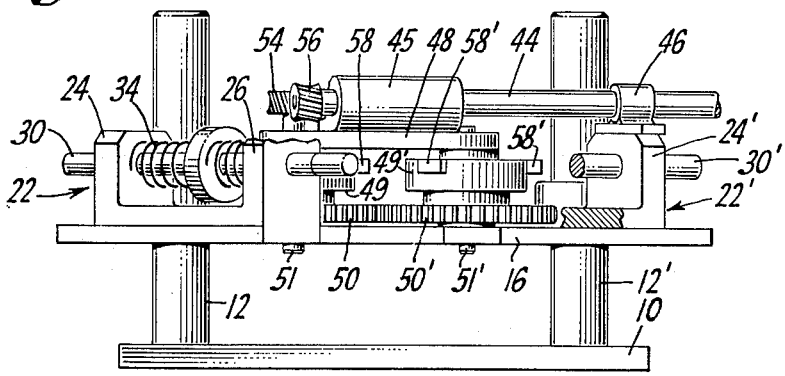
INVENTOR
ROY A. McNAUGHTON
BY
ATTORNEY

United States Patent Office 2,738,459
Patented Mar. 13, 1956

2,738,459

SHOCK TESTER FOR ELECTRON DISCHARGE DEVICES

Roy A. McNaughton, Emporium, Pa., assignor to Sylvania Electric Products Inc., a corporation of Massachusetts Application July 25, 1952, Serial No. 300,878

14 Claims. (Cl. 324—20)

This invention relates to testing apparatus, and more particularly to an adjustable mechanical shocking device for use in uniformly impact testing electron tubes or other articles.

In testing electron tubes for faulty connections and internal short circuits, it has been heretofore customary to connect the tube to an external indicator unit capable of supplying operating potentials to the tube components under test and of providing visual and/or audible indications of defects. The connected tube was then subjected to mechanical shock to place the tube components in motion thereby causing faults, such as poor welds, microphonics, and intermittent short circuits, to manifest themselves as output in the related indicator unit.

The feasibility of employing this test procedure in the mass production of tubes and the like, is determined by the degree of uniformity in the mechanical shocking of successive tubes being tested. Variations in impact intensity, such as occur when an operator produces the shock by means of a hand driven mallet, render this test procedure inaccurate and unreliable.

Accordingly, it is an object of the present invention to provide a novel device for uniformly shock exciting electron tubes and like devices.

Additionally, it is advantageous to be able to control the intensity or level of the impact, and to adjust the impact level over a relatively wide range. Control and adjustability of the impact level make it possible to shock test a wide variety of electron tubes or other devices without running the risk of damaging or shattering the devices due to excessive mechanical shock. Further, it is often desirable to vary the number of times a given device is shocked and to predetermine the duration of the test.

Therefore, it is another object of the present invention to provide a mechanical shocking device for impact testing vacuum tubes or the like which is capable of accurate adjustment over a relatively wide range of impact levels.

A further object of the present invention is the provision of a testing apparatus capable of uniformly imparting a predetermined number of mechanical shocks to a vacuum tube at a predeterminable repetition rate.

When such a testing unit includes a circuit arrangement for noise testing of vacuum tubes, lack of uniformity in shock impulses applied to the tubes render such a test unreliable, and accurate control of the impact level becomes exceptionally important. Obviously, too, where electrical noise measurements are being made, spurious noise contributions in the form of bursts of electrical energy in the vicinity of the measuring equipment are extremely undesirable.

Accordingly, it is a still further object of the invention to provide a mechanically operated and controlled apparatus for uniformly impact testing electron tubes in a manner virtually precluding the generation of spurious interference and noise.

The above and still further objects and advantages of the invention will become apparent from the following detailed description of an impact testing apparatus adapted in its illustrative embodiment for tube testing, but equally useful for testing other devices, when taken in conjunction with the accompanying drawing, wherein:

Fig. 1 is a plan view, with parts broken away and shown in section, of an impact testing device embodying features of the present invention; and Fig. 2 is an elevation view, with parts omitted and broken away for the purposes of clarity, of the device shown in Fig. 1.

Referring now to Figs. 1 and 2, there is shown an illustrative mechanical shocking device particularly adapted for impact testing an electron tube or the like at a given repetition rate and with an intensity readily controlled over a wide range. Specifically, the testing apparatus includes a base 10 carrying a pair of standards 12, 12' spaced from a socket or similar receptacle 14 for supporting the tube to be tested 11 with its major axis substantially parallel to the standards.

Spaced above and parallel to the base 10 is an adjustable mounting plate 16 slidably connected to the standards 12, 12' by the integral bosses 18, 18'. The adjustable mounting plate 16 is securable at various spaced locations above the base 10 by the threaded thumb screws 20, 20' traversing bosses 18, 18' and bearing against the standards 12, 12'.

Mounting brackets 22, 22' are fixed to the plate 16, the brackets being arranged normal to each other and to the axis of the tube supported within the socket 14. The brackets 22, 22' are provided with spaced guide blocks 24, 26 and 24', 26' having aligned bores to slidably support tappers 28, 28' which converge toward each other and extend radially on the tube under test. The tappers 28, 28' embody supporting plungers 30, 30' carrying resilient tips 32, 32' on the convergent ends. Resilient tips 32, 32' may be of melt, plastic or other material capable of preventing damage to the walls of the object under test. As can be seen in Fig. 1, the lines of action of the respective tappers 28, 28' are at right angles to each other and to the major axis of the tube under test. However, it is to be expressly understood that a lesser or greater number of tappers may be employed and arranged to strike the device under test at different angles.

The tappers 28, 28' are mounted for motion in translation along their respective lines of action by means of resilient suspensions. Specifically, counteracting pairs of axially aligned springs 34, 36 and 34', 36' are arranged on opposite sides of stop collars 38, 38'. The collars 38, 38' are adjustable longitudinally of the respective supporting plungers 30, 30' and are secured in place by set screws 40, 40'. As clearly seen in Fig. 1, the equilibrium position of the tappers 28, 28' may be adjusted by fixing the stop collars 38, 38' at various positions along the supporting plungers 30, 30'. Accordingly, the initial adjusted position of the tappers relative to the tube under test may be accurately controlled within prescribed limits.

In order to set the respective tappers into motion, an operating mechanism, generally designated by the numeral 42, is provided for initially displacing the tappers 28, 28' from the equilibrium position to a position where the springs 34, 34' are stressed in compression. Upon release, the tappers 32, 32' will be placed in motion, propelled by the release of tension in springs 34, 34'. The amplitude of the first excursion, assuming for a moment that there is no object under test, would be determined by the initial displacement of the tappers from the equilibrium position, and by the characteristics of propelling springs 34, 34' and restoring springs 36, 36', while the amplitude of succeeding oscillations would be reduced in dependence upon the damping effect of the friction in guides 24, 24', 26 and 26'. The amplitude of the first excursion is made sufficient to assure that tips 32, 32' strike a tube under test while, preferably, the amplitude of the next successive oscillation is so damped by friction and impact with the tube that tappers 32, 32' do not again reach the tube until the cycle is started again.

The mechanical operating mechanism 42 includes a rotating drive shaft 44 connected to a suitable source of power (not shown) and supported on bearings 45 and 46. The bearing 45 is supported on a bearing plate 48 carried by vertically extending integral lug 49 on adjustable mounting plate 16, while the bearing 46 is mounted on the bracket 22'. A pair of intermeshing gears 50, 50' are mounted on suitable stub shafts 51, 51' journaled in the mounting plate 16 and the bearing plate 48, the gears being driven by a pinion 54 operatively connected to gear 50 and in turn driven by a worm 56 carried on the adjacent end of the drive shaft 44. Gear 50 carries radially extending sears 58 successively engageable with the stop collar 38 of the tapper 28, while the gear 50' carries similar pawls 58' successively engageable with the stop collar 38' of tapper 28'. The number of sears may be controlled, as may the angular velocities of gears 50, 50' in order to vary the number of blows delivered by each tapper in a given time interval. Rotary motion of drive shaft 44 thus drives the meshing gears 50, 50' in opposite directions, causing the associated sears 58, 58' to engage periodically the adjacent tapper collars intermittently to displace the same from the initial equilibrium position.

The impact testing device may be operated in substantially the following manner: Power is imparted to the drive shaft 44 whereupon the gears 50, 50' are rotated in opposite directions causing successive pawls 58, 58' to bear against the associated stop collars 38, 38', placing the springs 34, 34' of the resilient suspensions in compression. As is apparent, further rotation of gears 50, 50' will cause release by sears 58, 58' of the respective tappers as contact with the respective stop collars is lost, and the release may be made simultaneously or in any predetermined timed relationship by varying the relative angular positions of the wheels 50, 50'. It is therefore possible to cause the tappers to strike the tube concurrently or alternately. Upon release of the stop collars by their associated sears, the compressed springs 34, 34' of the resilient suspensions expand, driving the tappers 28, 28' toward the tube under test. By suitable selection of the springs and of the displacement between the equilibrium position and the retracted position, a sufficient momentum is imparted to the tappers to cause them to strike the tube under test. In response to the movement of the tappers 28, 28' toward the tube, the springs 36, 36' are placed in compression thereby acquiring sufficient potential energy to return the tappers to neutral after the impact, but ordinarily insufficient to appreciably decelerate the tappers or to set up an oscillation of an amplitude sufficient to cause the tapper to strike the tube a second time. As illustrated, this action is repeated alternately for each tapper, the number of impacts during one revolution of the drive shaft 44 being determined by the number of sears of the respective operating mechanisms. The total number of shocks delivered by the unit may readily be controlled by accurate control of the rotation of drive shaft 44, i. e., by starting and stopping the shaft. Obviously, where necessary, the amount of energy developed in the springs under compression may be adjusted by changing the position of the respective stop collars 38, 38', by making the spaced guide blocks 24, 24' adjustable relative to the spaced guide blocks 26, 26', or by changing the characteristics of the springs themselves.

From the foregoing it can be seen that the automatic tapping device of the present invention provides for impacting of electron tubes at high test speeds, and is capable of operation over a wide range of impact levels. Adjustment can be effected readily by varying either the amount of initial compression applied to the springs of the resilient suspension, the displacement of the supporting plunger from the equilibrium position to the loaded position, or both. The aforementioned advantages are achieved by a system capable of assuring a high degree of uniformity in the strength of shocks delivered to objects under test since the drive force is obtained from springs activated by a mechanical operating mechanism which successively imparts the same amounts of displacement and energy to each stroke of the tapper plunger. Additionally these excellent results are obtained by mechanisms requiring little maintenance or lubrication, thereby avoiding accumulations of dust or the like which are likely to cause sticking and consequent changes in impact level and assuring trouble free operation.

It is understood, of course, that the below appended claims should be interpreted in the light of the spirit of the invention rather than solely in the light of the illustrative embodiment described above.

What I claim is:

1. An apparatus for impact testing an electron discharge device having a socket for maintaining said discharge device in position for testing and for making connection between the discharge device and external testing circuitry, pairs of spaced guides disposed radially of said testing position, a tapper rod being associated with each pair of spaced guides and slidably supported therein for motion over and away from said testing position, pairs of oppositely acting spring disposed between a pair of spaced guide members and the associated tapper and cooperating to locate each tapper at an equilibrium position adjacent to said discharge device being tested, and a mechanical drive for translating rotational motion from a power source into intermittent displacements of said tappers away from said positions of equilibrium in a direction away from said tube being tested.

2. The apparatus of claim 1 in which said mechanical drive includes a rotating member associated with each tapper and carrying a number of radially disposed sears and in which said tappers are provided with transversely located collars having surfaces located substantially perpendicular to the axis of the tapper and adapted to engage a portion of said sears, said sears and said collars on said tappers being disposed to first permit engagement of the sear and the collar, to then permit displacement of the collar and the tapper in a direction away from the tube being tested, and to then permit release of the collar by the sear.

3. An apparatus for impact testing an electron discharge device, said apparatus having a socket for maintaining said discharge device in testing position and for making connection between the discharge device and external testing circuitry, at least one guide disposed radially of said position, an elongated tapper slidably mounted in said guide for motion toward and away from said testing position, a pair of oppositely acting resilient members associated with said tapper and cooperating with said guide to locate said tapper at an equilibrium position adjacent said testing position, and mechanical means associated with said tapper and coacting therewith for affecting displacement thereof from said equilibrium position and for subsequently releasing said tapper when in said displaced position, whereby said tapper is urged into impactment with said discharge device by said resilient members.

4. An apparatus for impact testing an electron discharge device, said apparatus having a socket for maintaining said discharge device in testing position and for making connection between the discharge device and external testing circuitry, at least one guide disposed radially of said position, an elongated tapper slidably mounted in said guide for motion toward and away from said testing position, said tapper having a laterally projecting portion, a pair of oppositely acting resilient members associated with said taper and cooperating with said guide to locate said tapper at an equilibrium position adjacent said testing position, and mechanical means associated with said tapper and co-acting therewith for affecting displacement thereof from said equilibrium position and for subsequently releasing said tapper when in said displaced position, said means including a rotating member carrying at least one sear adapted to engage said projecting portion and to release said projecting portion at said displaced position, whereby said tapper is urged into impactment with said discharge device by said resilient members.

5. An apparatus for impact testing an electron discharge device having a socket for maintaining said discharge device in testing position and for making connection between the discharge device and external testing circuitry, a number of guides disposed radially of said position, a number of elongated tappers slidably mounted in said guides for motion toward and away from said testing position, each having a laterally projecting portion, pairs of oppositely acting resilient members associated with each of said elongated tappers and cooperating with said guides to locate said tappers at equilibrium positions adjacent to said testing position, and mechanical means associated with said tappers and co-acting therewith for affecting displacement thereof from said equilibrium position and for subsequently releasing said tappers when in said displaced position, said means including individual rotating members carrying a number of sears adapted to engage said laterally projecting portions and to release said projecting portions at said displaced position, whereby said tapper is urged into impactment with said discharge device being tested by said resilient members, and a gearing arrangement associated with said members for operating said members from a common source of power.

6. An impacting device for use in impact-testing an article such as an electronic tube, said device comprising at least one tapper, a support for mounting said tapper for motion along a predetermined path of impacting movement, oppositely acting biasing means operatively engaging said tapper and cooperating to locate said tapper at a position of equilibrium in said path, and mechanical driving means for intermittently engaging said tapper to effect displacement of said tapper from said position of equilibrium in a direction away from said article being tested.

7. An impacting device for use in impact-testing an article such as an electronic tube, said device comprising at least one tapper, a support for mounting said tapper for motion along a predetermined path of impacting movement, oppositely acting energy-storing means mounted in said support and operatively engaging said tapper, said energy storing means cooperating to locate said tapper at a position of equilibrium in said path, and driving means intermittently engaging said tapper to effect displacement of said tapper from said position of equilibrium in a direction away from said article being tested.

8. An impacting device for use in impact-testing an article such as an electronic tube, said device comprising at least one tapper; a support for mounting said tapper for motion along a predetermined path of impacting movement; a pair of oppositely acting resilient members held by said support and operatively engaging said tapper, said members cooperating to locate said tapper to a position of equilibrium in said path; and driving means intermittently engaging said tapper to effect displacement of said tapper from said position of equilibrium in a direction away from said article being tested.

9. An impacting device for use in impact-testing an article such as an electronic tube, said device comprising an elongated tapper; spaced guides for mounting said tapper for motion along a predetermined path of impacting movement; a pair of oppositely acting springs disposed between said guides and a portion of the associated tapper, said springs cooperating to locate said tapper at a position of equilibrium in said path; and driving means intermittently engaging said tapper to effect displacement of said tapper from said position of equilibrium in a direction away from said article being tested.

10. In an apparatus for impact testing an article such as an electronic tube, means for maintaining said article in testing position; at least one tapper; a number of guide members disposed radially of said position, said tapper being mounted on said guide members for motion along a path of impacting movement traversing said position; oppositely acting biasing means operatively engaging said tapper and cooperating to locate said tapper at a position of equilibrium in said path; and driving means intermittently engaging said tapper to effect displacement of said tapper from said position of equilibrium in a direction away from said article.

11. An impacting device for use in impact testing an article such as an electronic tube, said device comprising a base including a standard; a bracket adjustably mounted on said standard and including spaced guide members; a tapper mounted on said guide members for motion along a path of impacting movement; oppositely acting springs interposed between said guide members and operatively engaging said tapper, said springs cooperating to locate said tapper in a position of equilibrium in said path; and driving means intermittently engaging said tapper to effect displacement of said tapper from said position of equilibrium in a direction away from said article being tested.

12. In an apparatus for impact-testing an article such as an electronic tube, means for maintaining said article in testing position, at least one tapper, a support for mounting said tapper for motion along a path of impacting movement traversing said position, propelling and restoring springs mounted in said support and operatively engaging said tapper, and driving means intermittently engaging said tapper to effect displacement of said tapper against said propelling spring and away from article.

13. In an apparatus for impact-testing an article such as an electronic tube, means for maintaining said article in testing position; at least one tapper; a number of guide members disposed radially of said position, said tapper being mounted on said guide members for motion along a path of impacting movement traversing said position; propelling and restoring springs operatively engaging said tapper, said springs cooperating to locate said tapper at a rest position in said path; and driving means intermittently engaging said tapper to effect displacement of said tapper from said rest position in a direction away from said article.

14. In an apparatus for impact-testing an article, means for maintaining said article in testing position; at least one tapper; a support for mounting said tapper for motion along a path of impacting movement traversing said position; a pair of springs mounted in said support and engaging said tapper, said springs being oppositely stressible in response to movement of said tapper relative to said position; and driving means intermittently engaging said tapper to effect displacement of said tapper relative to said article.

References Cited in the file of this patent

UNITED STATES PATENTS

| 1,869,067 | Malmquist | July 26, 1932 |
| 2,418,437 | Vogt | Apr. 1, 1947 |
| 2,476,297 | Harris | July 19, 1949 |
| 2,506,607 | McKendry | May 9, 1950 |
| 2,610,504 | Nigh | Sept. 16, 1952 |

FOREIGN PATENTS

| 450,678 | France | Jan. 25, 1913 |